United States Patent [19]

Becker et al.

[11] 3,777,880

[45] Dec. 11, 1973

[54] PLOW HARPOON-TYPE CONVEYOR

[75] Inventors: Roger T. Becker, Kalamazoo; Stephen L. Hatter, Portage; Donald McMullin, Jr., Kalamazoo, all of Mich.

[73] Assignee: Kalamazoo Conveyor Company, Kalamazoo, Mich.

[22] Filed: Apr. 13, 1972

[21] Appl. No.: 243,732

[52] U.S. Cl. .............................................. 198/221
[51] Int. Cl. ............................................ B65g 25/08
[58] Field of Search ............................ 198/221, 224

[56] References Cited
UNITED STATES PATENTS

| | | | |
|---|---|---|---|
| 3,659,702 | 5/1972 | Assauer | 198/221 |
| 3,158,257 | 11/1964 | Peras | 198/221 |

Primary Examiner—Richard E. Aegerter
Attorney—Samuel Kurlandsky

[57] ABSTRACT

An improved plow is provided for use in a harpoon-type or chip conveyor, the plow having a wide forward end and lateral walls. The lateral walls converge upwardly at the forward or leading portion of the plow and additionally converge rearwardly toward the trailing end. The plow is mounted below a supporting member in the form of a shaft or tube. In an improved embodiment the plow is made of two separate plow members mounted on the support in spaced-apart arrangement. Additionally, a longitudinal slot is provided in the lower wall of the tubular supporting member permitting the vertical flange of a T-shaped rail to be disposed in the slot and to permit the supporting member to slide on and to be guided by bearings mounted on the rail.

15 Claims, 6 Drawing Figures

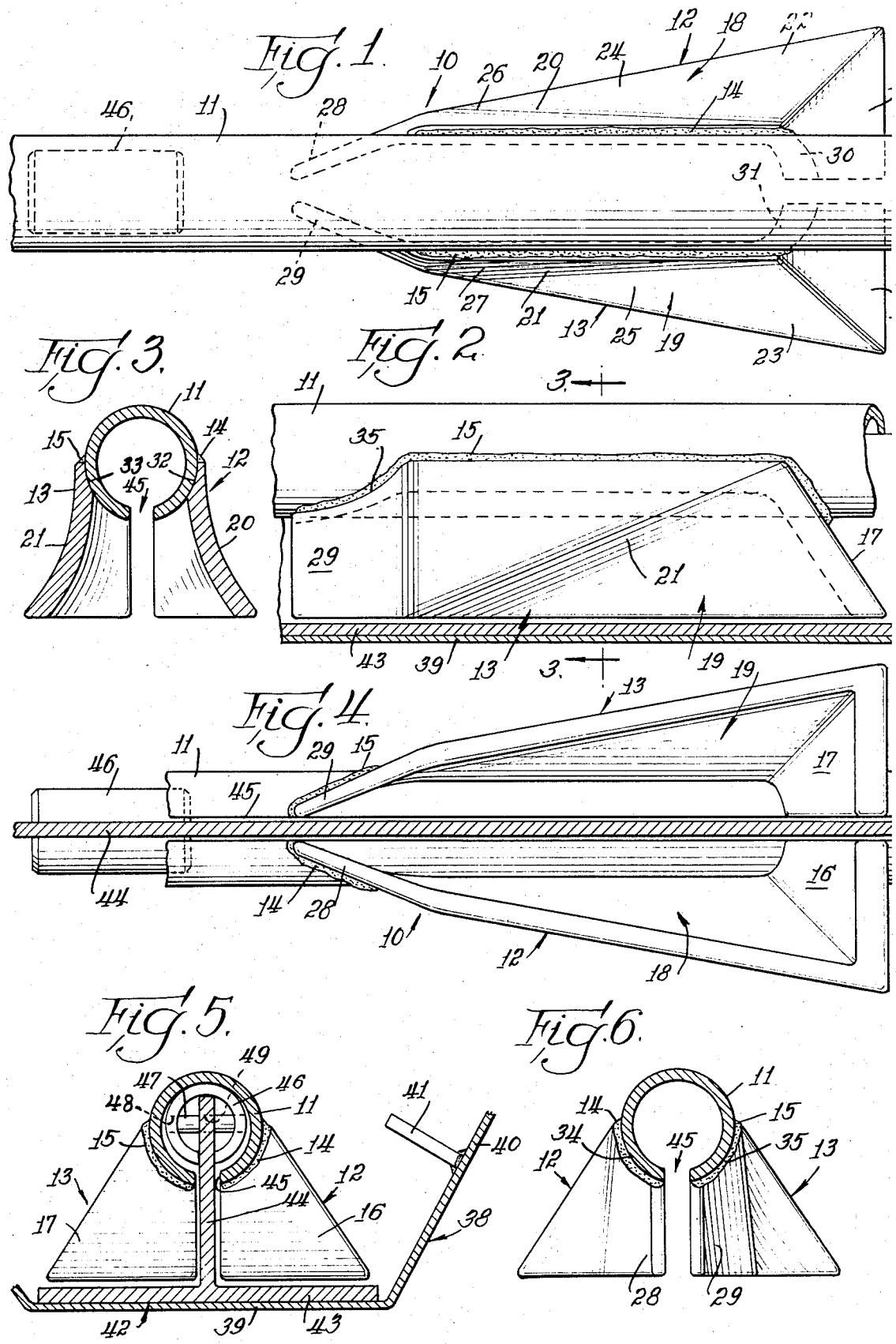

PLOW HARPOON-TYPE CONVEYOR

BACKGROUND OF THE INVENTION

Harpoon-type conveyors are finding widespread use in industry for many applications, and particularly for use in shops and factories utilizing large metal working machines such as lathes, drill presses, planers, and grinders, where they have given excellent service in removing waste materials such as metal scraps in the form of turnings or chips, either with or without a continuously flowing cutting oil. Certain improvements in harpoon-type conveyors are disclosed and claimed in our application for Letters Patent. Ser. No. 243,632 entitled "IMPROVED HARPOON CONVEYOR" and filed of even date. Such harpoon conveyors comprise a long continuous trough having directional material-retaining members or barbs mounted on the side wall thereof, a plurality of linearly arranged interconnected plows mounted for reciprocating motion along the trough, and a power means, generally of the hydraulic cylinder type connected to one end of the assembly for reciprocating the entire train of plows backward and forward. The plows are so shaped that they engage and move the material being conveyed with each forward stroke, and slide past the material to be conveyed with each rearward stroke. The retaining members or barbs cooperate on the rearward stroke to retain the conveyed material in place. The entire trough and plow mechanism may be mounted below the floor of the establishment as for example a machine stop, and may be fed by means of ducts from each machine. The conveyor is efficient, foolproof, and reliable and relatively inexpensive to manufacture and operate in comparison with other types of available conveyors. The use of the conveyor, particularly when mounted below floor level permits establishments such as machine shops to be operated under complete conditions of cleanliness. In spite of its eminent success in many fields, the harpoon-type or chip conveyor still has some deficiencies. The plows utilized in the conveyors of the prior art have been exceedingly heavy and cumbersome to assemble and operate, requiring high-pressure hydraulic equipment. It has been further found that during operation there is a tendency for conventional plows to become entangled in the chips being conveyed. It has further been found that the efficiency of conventional harpoon-type conveyors is less than optimum. As they travel forward they do not carry all the conveyed material forward with the plow, and additionally result in tangling of the material when it is in the form of turnings or chips. Additionally, when in the rearward portion of the reciprocating cycle, conventional plows tend to drag the material back with them. Further, conventional plows are clumsy and heavy to handle.

SUMMARY OF THE INVENTION

Accordingly, it is an object of the present invention to provide a more efficient plow for use in a harpoon-type conveyor and one which is more effective in picking up and transporting the conveyed material in the forward portion of the reciprocating cycle, and more efficient in releasing the adjacent conveyed material on the rearward stroke of the reciprocating cycle.

It is a further object to provide an improved plow which does not become entangled in the transported chips or similar material during its reciprocating motion.

It is still an additional object to provide a plow of the type described which is easier to push backward and forward and which therefore may be suitably operated with reduced hydraulic pressure capability.

It is a further object to provide such a plow which is relatively simple and inexpensive to manufacture and use.

Still further objects and advantages of the invention will appear as the description proceeds.

To the accomplishment of the foregoing and related ends, the invention, then, consists of the harpoon conveyor herein fully described and particularly pointed out in the claims, the annexed drawing, and the following description setting forth in detail an illustrative embodiment of the invention, such disclosed embodiment illustrating, however, but one of the various ways in which the principles of the invention may be used.

BRIEF DESCRIPTION OF THE DRAWING

In the annexed drawing:

FIG. 1 is a top view of the improved plow and supporting member according to the invention.

FIG. 2 is a side elevational view of the plow shown mounted on a T-shaped rail.

FIG. 3 is a cross-sectional view taken at the line 3—3 of FIG. 2, looking in the direction of the arrows.

FIG. 4 is a bottom view of the plow.

FIG. 5 is a front elevational view of the plow shown mounted on a T-shaped rail; and FIG. 6 is a rear elevational view of the plow.

DESCRIPTION OF THE SPECIFIC EMBODIMENT

Referring to FIG. 1, a plow assembly 10 is shown comprising a tubular supporting member 11 having a pair of plow members 12 and 13 affixed to the sides thereof by means of welding beads 14 and 15. The plow members 12 and 13 have forward or leading end walls 16 and 17, respectively, each in the form of a ramp which is inclined rearwardly. The plow members 12 and 13 have lateral walls 18 and 19 which are provided with diagonal recesses 20 and 21, respectively. Forward portions of the lateral walls 22 and 23 are inclined or converge upwardly toward each other at an angle of about 60° with respect to the horizontal base of the plow members 12 and 13. The diagonal recesses 20 and 21, as shown in FIG. 2, are oriented from an upper forward position down to a lower rearward position. As a result of this structure, the lateral wall in the intermediate portions 24 and 25 thereof take on an outwardly concave form, as can be seen in FIG. 3. As the lateral walls 18 and 19 progress further rearwardly and reach the rearward portions 26 and 27, they are almost vertical with respect to the horizontal base on which the plow rests. At the end of the plow there are provided trailing end walls 28 and 29 which converge toward each other rearwardly at an angle substantially greater than that at which the side walls converge.

In order that they may be welded to the contour of the tubular supporting member 11 the plow members 12 and 13 are provided with forward end wall recesses 30 and 31 (FIG. 1), lateral wall recesses 32 and 33 (FIG. 3), and trailing end wall recesses 34 and 35 (FIG. 6). The welding bead 14 and 15 is laid along these recesses.

As can be seen in FIG. 1, the overall form of the plow is that of a triangular pyramid. The front wall of the plow is formed by the forward end walls 16 and 17, and is inclined rearwardly. The lateral walls 18 and 19 are in part inclined upwardly and converge toward each other, with the change in inclination caused by the existence of the diagonal recesses 20 and 21 resulting in an outwardly concave shape in the central portions of the lateral walls, as shown in FIG. 3. The trailing end walls converge toward each other at a somewhat increased angle. As seen in FIG. 4, the base of the plow is almost in the form of an isosceles triangle with the trailing end walls breaking the lines slightly to increase the convergence. The plow is widest at its forward end, the width continually decreasing toward the rear portion thereof. If desired the plow may be extended above the supporting member 11.

The plow of the present invention may be utilized with any of various types of harpoon conveyor mounting structures. One such structure is shown in FIGS. 2, 4 and 5 and comprises a trough 38 having a flat bottom 39 and diverging side walls 40 terminating in vertical side walls (not shown). Material retaining members or barbs 41 are dispersed at various positions along the side walls 40 and serve to retain the conveyed material such as chips in place while the plow goes through its rearward portion of the reciprocating cycle. The plows are supported on an inverted T-shaped rail 42 having a bottom plate 43 and a vertical flange 44. A longitudinal slot 45 is provided along the entire length of the tubular supporting member 11 so that the supporting member slides over the vertical flange 44, with the vertical flange 44 extending through the slot 45 and into the axial channel of the supporting member. Bearing collars 46 having slots provided therein are mounted within the axial channel of the supporting member 11 and with the vertical flange 44 extending through the slot and engaging the opposite side wall of the bearing collar 46. The bearing collar 46 is affixed to the vertical flange 44 by means of a roll pin or spiral pin 47 extending through holes 48 in the bearing collar 46, and through a hole 49 provided in the vertical flange 44.

In assembling the harpoon conveyor of the present invention, a trough is first constructed and placed, either above or below floor level, in the desired location. The rail 42 is then placed in and affixed to the bottom of the trough. A plurality of plows are then placed in position over the rail and affixed in place by means of the bearing collars 46 and roll pins 47. A reciprocating power means, as for example a hydraulic reciprocating cylinder and connecting rod is positioned at one end of the conveyor and imparts a reciprocating motion to the entire train of plows. As the plows move rearwardly, because of their general shape and particularly because the rearward portion is narrower than the forward portion, the plows slide past the conveyed material held back by the retaining members 41 in the trough. However, on the forward motion the material is engaged by the wide forward or leading end of the plow. Consequently in the forward stroke the material is moved forward. On the subsequent rearward stroke, the material remains in place, and then moves still further forward on the successive forward stroke. Eventually all the conveyed material is collected and transferred to the remote end of the trough and discharged into a suitable hopper or container.

The plow of the present invention has many advantages over conventional plows utilized in harpoon-type conveyors. Because of the particular contours of the plow, dramatically improved material flow through the conveyor is obtained. Because of the improved efficiency, satisfactory operation may be obtained even with reduced hydraulic pressure equipment. The plow completely eliminates problems previously encountered with material such as bar ends. The plow members may be made of light metal such as aluminum, with consequent reduction in wear on bushings and bearings. The structure of the plow results in substantial cost savings in materials and assembly. Because of the tapered form of the plow in the rearward direction, back movement of the conveyed material on the reverse stroke is largely eliminated. On the forward motion, because the leading end is rearwardly inclined, a lifting motion is imparted to the conveyed material and prevents an impacting wedge movement which would occur if the forward wall were vertical.

While but only one of the embodiments of the invention has been shown and described, other equivalent forms will now be apparent to those skilled in the art. Therefore, the embodiment shown in the drawing is merely diagrammatic and for illustrative purposes, and is not intended to limit the spirit and scope of the invention as above described and illustrated in the drawing.

Although the present invention has been shown and described in the form of structure in which the plow is susbstantially below the supporting member, additional plow members of various forms may be mounted on the tubular supporting member 11 above the lower plow if desired.

The embodiments of the invention in which an exclusive property or privilege is claimed are defined as follows:

1. A plow assembly for use in a harpoon-type conveyor, comprising:
 a. a supporting member,
 b. a plow affixed thereto and disposed substantially below said supporting member having a forward end adapted to be positioned to push material to be conveyed in a forward direction along the conveyor on the forward stroke, and a rear or trailing end adapted to slide past the material to be conveyed on the rearward stroke, comprising:
  1. a relatively wide forward end wall adapted to engage and push forward material to be conveyed,
  2. a pair of lateral walls converging toward each other rearwardly and having a forward portion of each lateral wall adjacent said forward end wall converging upwardly with respect to each other over substantially the entire height of said lateral walls.

2. A plow assembly according to claim 1, wherein said lateral walls have trailing members at the rearward end of said plow converging rearwardly with respect to each other at a greater angle than the rearward convergence of the forward portion of said lateral walls.

3. A plow assembly according to claim 1, wherein said forward end wall is inclined rearwardly over substantially the entire height thereof, thereby imparting a lifting movement to the material being conveyed.

4. A plow assembly according to claim 1, wherein the intermediate portions of said lateral walls are concave outwardly.

5. A plow assembly according to claim 1, wherein said lateral walls each have a diagonal recess provided therein substantially connecting the upper front corners thereof to the lower rear corners thereof, whereby the forward and lower portions of said lateral walls have a greater angle of convergence upwardly, and the upward and rearward portions of said lateral walls have a smaller angle of convergence upwardly with respect to each other.

6. A plow assembly for use in a harpoon-type conveyor which comprises a trough of generally U-shape, guide means disposed along said trough, and at least one plow slidably mounted on said guide means, said plow having a forward end positioned to push material to be conveyed in a forward direction on the forward stroke of said plow, and a rear or trailing end positioned to slide past the material to be conveyed on the rearward stroke, said plow comprising:
 a. an elongate supporting member, and
 b. a pair of complementary cooperating plow members affixed thereto and disposed substantially below said supporting member, each plow member comprising:
  1. a forward end wall adapted to engage and push forward material to be conveyed, and
  2. a lateral wall, the lateral walls of said plow members converging with respect to each other rearwardly and the forward portions of said lateral walls adjacent said forward end walls converging upwardly with respect to each other over substantially the entire height of said lateral walls.

7. A plow assembly according to claim 6, wherein said lateral walls have trailing members at the rearward end of said plows converging rearwardly with respect to each other at a greater angle than the rearward convergence of the forward portion of said lateral walls.

8. A plow assembly according to claim 6, wherein said forward end walls are inclined rearwardly over substantially the entire height thereof, thereby imparting a lifting movement to the material being conveyed.

9. A plow assembly according to claim 6, wherein the intermediate portions of said lateral walls are concave outwardly.

10. A plow assembly according to claim 6, wherein said lateral walls each have a diagonal recess provided therein substantially connecting the upper front corners thereof to the lower rear corners thereof, whereby the forward and lower portions of said lateral walls have a greater angle of convergence upwardly with respect to each other and the upward and rearward portions of said lateral walls have a smaller angle of convergence upwardly with respect to each other.

11. A plow assembly for use in a harpoon-type conveyor which comprises a trough of generally U-shape, guide means disposed along said trough in the form of an inverted-T rail having a bottom plate and a vertical flange, and at least one plow slidably mounted on said guide means, said plow having a forward end positioned to push material to be conveyed in a forward direction on the forward stroke of said plow assembly, and a rear or trailing end positioned to slide past the material to be conveyed on the rearward stroke, said plow comprising:
 a. a tubular supporting member having a longitudinal slot provided in the lower wall thereof and extending along the entire length of said supporting member, and
 b. a pair of complementary cooperating plow members affixed thereto and disposed substantially below said supporting member and being sufficiently spaced-apart to permit the vertical flange of said guide means to extend therebetween and to be inserted in the longitudinal slot of said supporting member, said plow member comprising:
  1. a forward end wall adapted to engage and push forward material to be conveyed, and
  2. a lateral wall, the lateral walls of said plow members converging toward each other rearwardly and the forward portions of said lateral walls adjacent said forward end walls converging upwardly with respect to each other over the entire height of said lateral walls.

12. A plow assembly according to claim 11, wherein said lateral walls have trailing members at the rearward end of said plows converging rearwardly with respect to each other at a greater angle than that of the rearward convergence of the forward portion of said lateral walls.

13. A plow assembly according to claim 11, wherein said forward end walls are inclined rearwardly over substantially the entire height thereof, thereby imparting a lifting movement to the material being conveyed.

14. A plow assembly according to claim 11, wherein said lateral walls each have a diagonal recess provided therein substantially connecting the upper front corners thereof to the lower rear corners thereof, whereby the forward and lower portions of said lateral walls have a greater angle of convergence upwardly with respect to each other and the upward and rearward portions of said lateral walls have a smaller angle of convergence upwardly with respect to each other.

15. A plow assembly according to claim 11, wherein said plow members are formed of aluminum.

* * * * *

UNITED STATES PATENT OFFICE
CERTIFICATE OF CORRECTION

Patent No. 3,777,880     Dated December 11, 1973

Inventor(s) Roger T. Becker et al.

It is certified that error appears in the above-identified patent and that said Letters Patent are hereby corrected as shown below:

In the title, delete "Plow Harpoon-Type Conveyor", and insert -- Plow for Harpoon-Type Conveyor --.

Signed and sealed this 1st day of April 1975.

(SEAL)
Attest:

RUTH C. MASON
Attesting Officer

C. MARSHALL DANN
Commissioner of Patents
and Trademarks